US010303915B2

(12) United States Patent
Wang et al.

(10) Patent No.: US 10,303,915 B2
(45) Date of Patent: May 28, 2019

(54) ULTRASONIC BIOMETRIC SENSOR

(71) Applicant: ORIENTAL SYSTEM TECHNOLOGY INC., Hsinchu (TW)

(72) Inventors: Chein-Hsun Wang, Hsin-Chu (TW); Wen-Chie Huang, Hualien County (TW)

(73) Assignee: ORIENTAL SYSTEM TECHNOLOGY INC., Hsinchu (TW)

( * ) Notice: Subject to any disclaimer, the term of this patent is extended or adjusted under 35 U.S.C. 154(b) by 0 days.

(21) Appl. No.: 15/864,326

(22) Filed: Jan. 8, 2018

(65) Prior Publication Data

US 2018/0211081 A1    Jul. 26, 2018

(30) Foreign Application Priority Data

Jan. 25, 2017   (CN) .......................... 2017 1 0061104

(51) Int. Cl.
*G06K 9/00*     (2006.01)
*G06F 21/32*    (2013.01)

(52) U.S. Cl.
CPC ....... *G06K 9/0002* (2013.01); *G06K 9/00107* (2013.01); *G06F 21/32* (2013.01)

(58) Field of Classification Search
CPC ... G06F 21/32; G06K 9/0002; G06K 9/00107
See application file for complete search history.

(56) References Cited

U.S. PATENT DOCUMENTS

| 2015/0165479 | A1* | 6/2015 | Lasiter | B06B 1/0666 |
| | | | | 310/322 |
| 2018/0129849 | A1* | 5/2018 | Strohmann | G06F 21/32 |
| 2018/0369866 | A1* | 12/2018 | Sammoura | B06B 1/0622 |

* cited by examiner

*Primary Examiner* — Tom Y Lu
(74) *Attorney, Agent, or Firm* — Muncy, Geissler, Olds & Lowe, P.C.

(57) ABSTRACT

An ultrasonic biometric sensor comprises a detection chip. The detection chip includes a substrate, an ultrasonic transducer array and a control circuit. The ultrasonic transducer array is arranged on the substrate, including a plurality of arrayed piezoelectric elements. Each piezoelectric element is disposed on a floating membrane. The floating membrane is suspended in the opening side of a cavity by at least one support arm extending transversely. The control circuit is also arranged on the substrate and electrically connected with each piezoelectric element through the support arm to control the ultrasonic transducer array to generate an ultrasonic signal and read the reflected ultrasonic signal received by the ultrasonic transducer array. The ultrasonic biometric sensor is easy to fabricate and has a high yield.

15 Claims, 4 Drawing Sheets

ULTRASONIC BIOMETRIC SENSOR

BACKGROUND OF THE INVENTION

1. Field of the Invention

The present invention relates to a biometric sensor, particularly to an ultrasonic biometric sensor.

2. Description of the Prior Art

The capacitive fingerprint sensor is a widely-used biometric sensor at present. However, the capacitive fingerprint sensor has poorer penetration capability, hard to penetrate the glass panel of a mobile Internet device (such as a mobile phone). Further, a wet or sweating finger is likely to affect the contrast of the image captured by the capacitive fingerprint sensor. Besides, the oil stain of a fingerprint may be cast into a dummy fingerprint. In other words, the capacitive fingerprint sensor is inferior in counterfeit-proof and vulnerable in security.

Ultrasonic waves can penetrate common case material of mobile phones, such as glass, aluminum, stainless steel, quartz and plastic, to scan fingerprints. Furthermore, ultrasonic waves can penetrate the surface of skin to detect 3D details and characteristics of fingerprints, such as friction ridges and sweat pores. Compared with the capacitive fingerprint sensor, the ultrasonic fingerprint sensor is superior in penetrability, 3D imaging capability, and anti-counterfeit capability. Therefore, the ultrasonic finger print sensor is an alternative high-performance biometric sensor for the applications of personal identification.

The ultrasonic fingerprint sensor is based on the acoustic impediography. While propagating in media of different densities and encountering different acoustic impedances, ultrasonic waves will generate different reflection waves intensity. Refer to FIG. 1. The conventional ultrasonic fingerprint sensor 100 comprises ultrasonic transducers 101 and a CMOS detection circuit 102 processing the signals received by the ultrasonic transducers 101. The ultrasonic waves emitted by the ultrasonic transducers 101 transmit through a buffer layer 110 (including the package materials, the panel and the casing) to the fingerprint FP of the user. The ridges R and valleys V of the fingerprint FP respectively have different acoustic impedances. Zr and Zv denote the acoustic impedance of a ridge and the acoustic impedance of a valley respectively with the values of 1.5M Rayl and 0.00043M Rayl for Zr and Zv, respectively. Let Zo denotes the acoustic impedance of buffer layer 110. The ridges R and valleys V have different acoustic reflection ratio Γ according to the following equation:

$$\Gamma = (Zi - Z0)/(Zi + Z0)$$

Wherein Zi is the acoustic impedance of the ridge R or valley V. When Γ is a negative value, it indicates that the phase of reflected wave is 180 degrees. In FIG. 1, US denotes the incident ultrasonic wave; USr and USv respectively denote the ultrasonic wave incident to the interface between the ridges R and the buffer layer 110 and the ultrasonic wave incident to the interface between the valleys V and the buffer layer 110. Since the acoustic impedances of the ridges R and the valleys V are different, the intensities of the reflected waves, which are corresponding to the ridges R and the valleys V and received by the ultrasonic transducer 101, are different. For example, the ultrasonic wave USr incident to the ridges R mostly becomes the transmission wave, and the ultrasonic wave incident to the valleys V mostly becomes the reflection wave, whereby the ridges R and valleys V can be distinguished in the image. Further, while ultrasonic waves penetrate the skin of the finger and reaches the bone and muscle/fat, the ultrasonic waves are respectively reflected by different ratios in the bone and muscle/fat. Thus, different tissues can be recognized after different time delays. Therefore, the ultrasonic fingerprint sensor has better anti-counterfeit performance by using 3D re-constructed details.

Refer to FIG. 1 again. The ultrasonic transducers 101 and the CMOS detection circuit 102 of the conventional ultrasonic fingerprint sensor 100 are electrically interconnected through pedestal layers 103. The pedestal layer 103 further forms a cavity 104 below the ultrasonic transducer 101 to make most of the ultrasonic waves generated by the ultrasonic transducer 101 project toward the buffer layer 110. In the conventional ultrasonic fingerprint sensor 100, the ultrasonic transducer chip and the CMOS detection chip are soldered together in a wafer bonding technology, which is high in manufacturing cost and low in yield.

Therefore, there is a need to manufacture ultrasonic fingerprint sensor without using the wafer bonding technology.

SUMMARY OF THE INVENTION

The present invention provides an ultrasonic biometric sensor, wherein a control circuit and an ultrasonic transducer array are fabricated on an identical substrate, whereafter an anisotropic etching process is used to form a cavity below each piezoelectric element of the ultrasonic transducer array, wherefore the present invention can fabricate an ultrasonic biometric sensor without using the wafer bonding technology, whereby the present invention can increase the yield and productivity and lower the fabrication cost.

In one embodiment, the ultrasonic biometric sensor of the present invention comprises a detection chip. The detection chip includes a substrate, an ultrasonic transducer array and a control circuit. The substrate has a first region and a second region. The ultrasonic transducer array is arranged on the first region and includes a plurality of arrayed piezoelectric elements. Each piezoelectric element is disposed in a floating membrane. The floating membrane is suspended in the opening side of a cavity by at least one support arm extending transversely. The control circuit is arranged on the second region and electrically connected with the piezoelectric elements through the support arms. The control circuit controls the ultrasonic transducer array to generate an ultrasonic wave and reads the reflected ultrasonic signal received by the ultrasonic transducer array.

Below, embodiments are described in detail in cooperation with the attached drawings to make easily understood the objectives, technical contents, characteristics and accomplishments of the present invention.

DESCRIPTION OF THE PREFERRED EMBODIMENT

Figure 1:
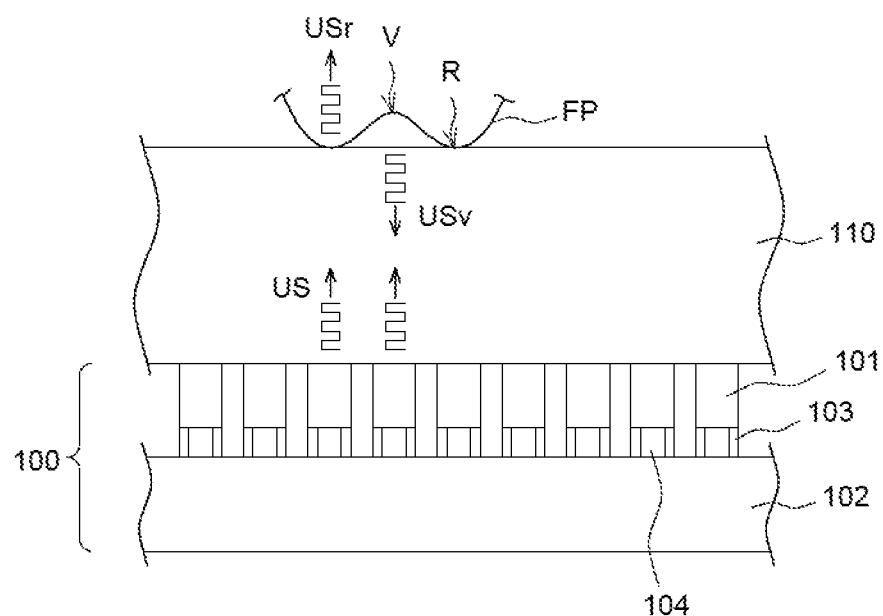
FIG. 1 is a diagram schematically a conventional ultrasonic fingerprint sensor.

The present invention will be described in detail with embodiments and attached drawings below. However, these embodiments are only to exemplify the present invention but not to limit the scope of the present invention. In addition to the embodiments described in the specification, the present invention also applies to other embodiments. Further, any modification, variation, or substitution, which can be easily made by the persons skilled in that art according to the embodiment of the present invention, is to be also included within the scope of the present invention, which is based on the claims stated below. Although many special details are provided herein to make the readers more fully understand the present invention, the present invention can still be practiced under a condition that these special details are partially or completely omitted. Besides, the elements or steps, which are well known by the persons skilled in the art, are not described herein lest the present invention be limited unnecessarily. Similar or identical elements are denoted with similar or identical symbols in the drawings. It should be noted: the drawings are only to depict the present invention schematically but not to show the real dimensions or quantities of the present invention. Besides, matterless details are not necessarily depicted in the drawings to achieve conciseness of the drawings.

Figure 2:
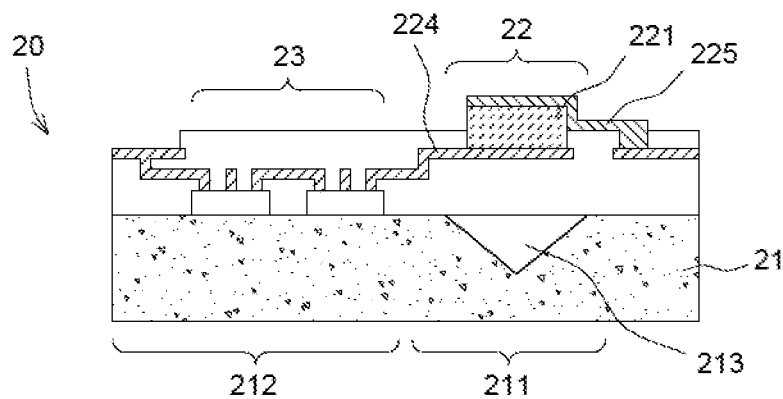
FIG. 2 is a diagram schematically showing an ultrasonic biometric sensor according to one embodiment of the present invention.
Figure 3:
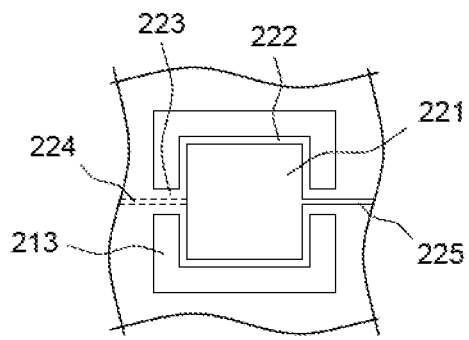
FIGS. 3-5 are top views several types of structures of a piezoelectric element of an ultrasonic biometric sensor according to embodiments of the present invention.
Figure 4:
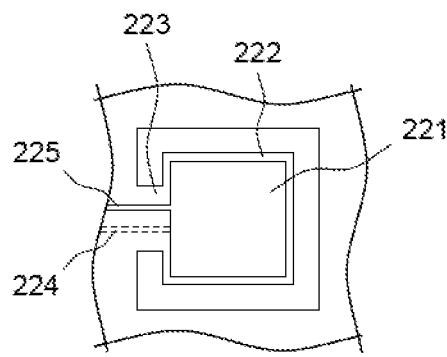
Figure 5:
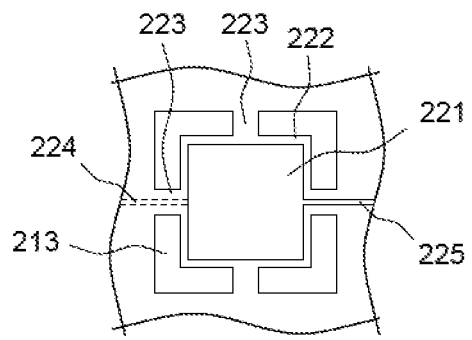

Refer to FIG. 2. In one embodiment, the ultrasonic biometric sensor comprises a detection chip 20. The detection chip 20 includes a substrate 21, an ultrasonic transducer array 22 and a control circuit 23. The substrate 21 has a first region 211 and a second region 212. The ultrasonic transducer array 22 is arranged on the first region 211 and includes a plurality of arrayed piezoelectric elements 221. Each piezoelectric element 221 is disposed in a floating membrane 222. The floating membrane 222 is suspended in the opening side of a cavity 213 by at least one support arm 223 extending transversely. Refer to FIG. 3. In one embodiment, the floating membrane 222 is suspended in the opening side of the cavity 213 by two support arms 223 extending transversely. However, the present invention is not limited by the embodiment. In other embodiments, the floating membrane 222 is suspended in the opening side of the cavity 213 by one or four support arms 223, as shown in FIG. 4 and FIG. 5. A material of the piezoelectric element 221 comprises polyvinylidene difluoride (PVDF), a mixture of polyvinylidene difluoride (PVDF) and trifluoroethylene (TrFE) (PVDF-TrFE), aluminum nitride (AlN) or lead zirconate titanate (PZT). The working frequency of the piezoelectric element 221 ranges from 20 to 30 MHz. In one embodiment, the spacing between the pixels of the ultrasonic transducer array 22, i.e. the spacing between the piezoelectric elements 221, is 50 μm.

Figure 6:
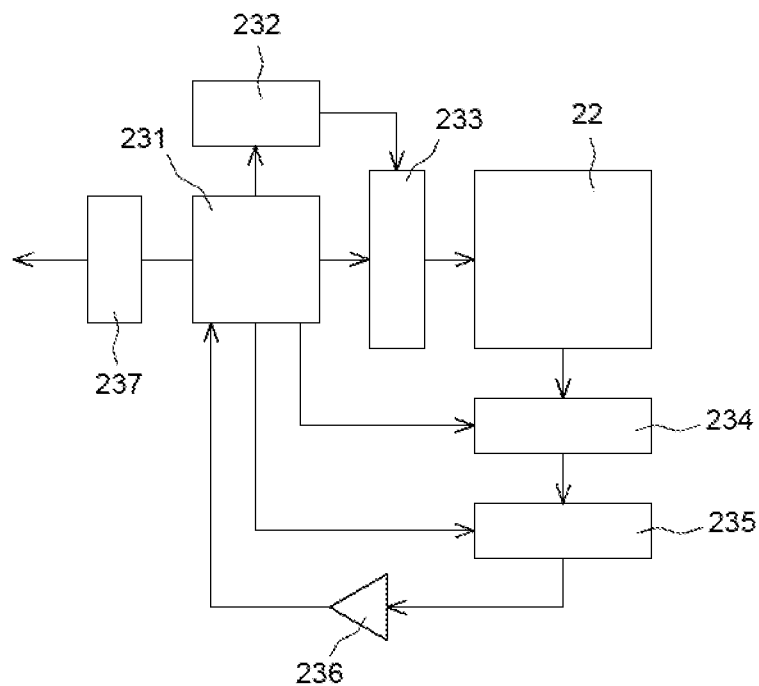
FIG. 6 is a block diagram schematically showing a control circuit of an ultrasonic biometric sensor according to one embodiment of the present invention.

The control circuit 23 is arranged on the second region 212. The control circuit 23 is electrically connected with each piezoelectric element 221 through the support arms 223. The control circuit 23 controls the ultrasonic transducer array 22 to generate ultrasonic waves and reads the reflected ultrasonic signals received by the ultrasonic transducer array 22. In the embodiment shown in FIG. 2 and FIG. 3, the control circuit 23 is electrically connected with the upper electrode and lower electrode of the piezoelectric element 221 through the electric-conduction traces 224 and 225 of the support arm 223. Refer to FIG. 6. In one embodiment, the control circuit 23 includes a controller 231, an ultrasonic pulse generator 232, a column decoder 233, an amplification circuit 234, a row decoder 235, an analog-to-digital converter 236, and a communication interface 237. The controller 231 receives an external instruction and generates a clock signal to control the ultrasonic transducer array 22 to transmit and receive ultrasonic waves and generate biometric verification signals. The ultrasonic pulse generator 232 is controlled by the controller 231 to generate a timing signal. In one embodiment, the working frequency of the ultrasonic waves ranges from 20 to 30 MHz, and the preferred working frequency is 25 MHz. In one embodiment, the controller 231 controls the column decoder 233 to drive the ultrasonic transducer array 22 to generate ultrasonic waves column by column and controls the amplification circuit 234 to undertake sample-and-hold actions simultaneously. Then, the controller 231 controls the row decoder 235 to output reflected ultrasonic signals row by row to the analog-to-digital converter 236 where the ultrasonic reflected signals are converted into digital signals. It is easily understood: the amplification circuit 234 and the analog-to-digital converter 236 may be regarded as signal processors. The digital signals output by the analog-to-digital converter 236 can be temporarily stored in the register of the controller 231. The controller 231 processes the digital signals into biometric verification signals and outputs the biometric verification signals through the communication interface 237 to an external device, such as an operating unit of a smart phone. In one embodiment, the communication interface 237 is a serial peripheral interface (SPI) or a universal serial bus (USB).

Figure 7:
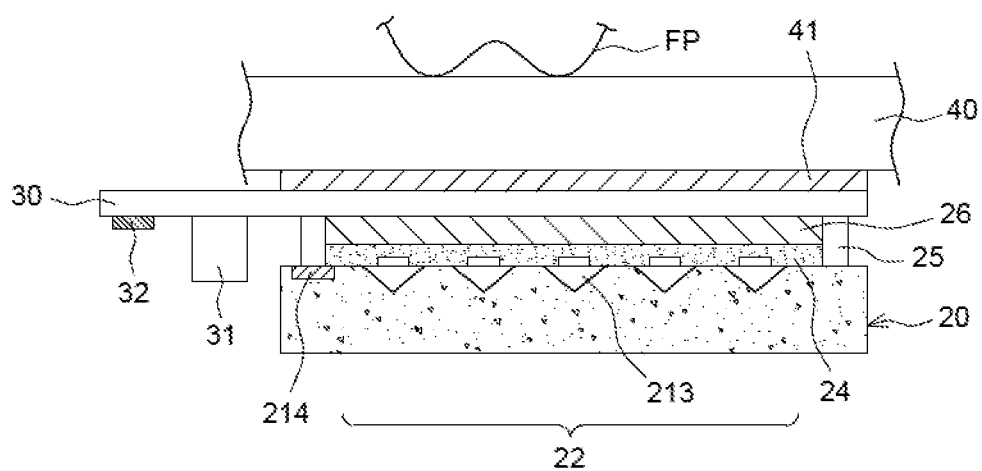
FIG. 7 is a diagram schematically showing a packaging structure of an ultrasonic biometric sensor according to one embodiment of the present invention.

Refer to FIG. 7. In one embodiment, the ultrasonic biometric sensor of the present invention further comprises a protection layer 24 covering the ultrasonic transducer array 22 and the control circuit 23 (also refer to FIG. 2). It is easily understood: the protection layer 24 should not be filled into the cavity 213 lest the function of ultrasonic emission be degraded. In one embodiment, the protection layer 24 is made of a photoresist material or polyimide (PI).

In one embodiment, the ultrasonic biometric sensor of the present invention further comprises a packaging substrate 30 and a passive element 31. The packaging substrate 30 includes a plurality of electric-conduction contacts 32 for external electric connection. In one embodiment, the packaging substrate 30 is made of polyimide (PI). The passive element 31 is arranged on a first surface of the packaging substrate 30. The detection chip 20 is also arranged on the first surface of the packaging substrate 30. In other words, the passive element 31 and the detection chip 20 are disposed on the same side. The detection chip 20 is electrically connected with the electric-conduction contacts 32 and the passive element 31 through the external electric-conduction contacts 214 of the substrate 21 and the electric-conduction traces on the packaging substrate 30. In one embodiment, the electric-conduction contacts 214 have a plurality of metal bumps 25 that can be joined with the packaging substrate 30 in a eutectic bonding technology, whereby the detection chip 20 and the packaging substrate 30 are assembled together and connected electrically. In one embodiment, the detection chip 20 is fixed to the packaging substrate 30 through a plurality metal bumps 25 and an anisotropic conductive film (ACF).

In one embodiment, the ultrasonic biometric sensor of the present invention further comprises a filling material 26 that is filled into the gaps between the detection chip 20 and the packaging substrate 30 to eliminate the gaps containing air. In one embodiment, the filling material 26 is a silica gel. After package, an adhesive glue 41 is used to fix the ultrasonic biometric sensor to a plate 40 that the user can touch, such as a faceplate or casing of a smart phone. While the finger of the user touches an area of the plate 40, which is within the sensing area of the ultrasonic transducer array 22, the ultrasonic biometric sensor of the present invention can read the fingerprint or another biometric characteristic of the user to verify the identity of the user.

Figure 8:
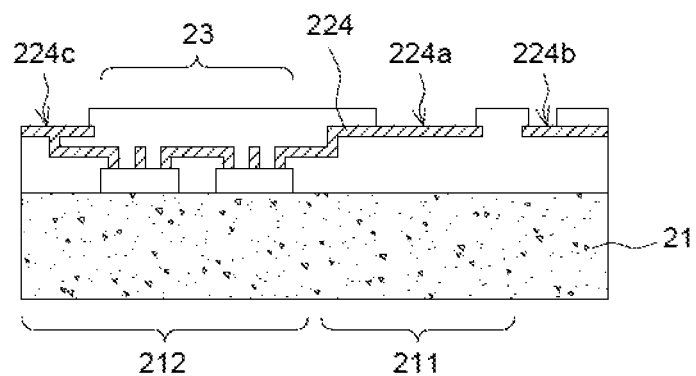
FIGS. 8-10 are diagrams schematically showing steps of fabricating an ultrasonic biometric sensor according to one embodiment of the present invention.

Below is described the method for fabricating the ultrasonic biometric sensor of the present invention. Refer to FIG. 7 and FIG. 8. Firstly, fabricate the control circuit 23 in the second region 212 of the substrate 21. In one embodiment, the control circuit 23 includes a complementary metal-oxide-semiconductor (CMOS) integrated circuit and interconnection traces. Next, form a passivation layer on the topmost layer, such as the electric-conduction trace 224), and form holes in the passivation layer to expose a portion of the electric-conduction trace 224, which is to function as the lower electrode 224 of the piezoelectric element 221 or the electric-conduction contacts 224b and 224c of the piezoelectric element 221, as shown in FIG. 8. In one embodiment, the electric-conduction contact 224b functions as the electric-conduction contact for electric connection with the upper electrode of the piezoelectric element 221; the electric-conduction contact 224c functions as the external electric-conduction contact 214 shown in FIG. 7.

Figure 9:
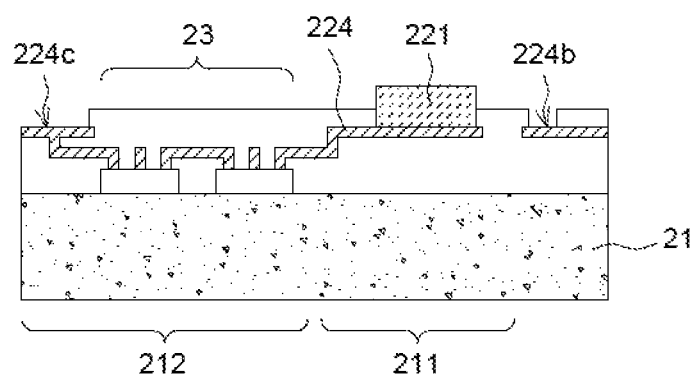

Refer to FIG. 9. Next, deposit or plate a piezoelectric material on the lower electrode 224a to form the piezoelectric element 221. In one embodiment, a material of the piezoelectric material comprises polyvinylidene difluoride (PVDF), a mixture of polyvinylidene difluoride (PVDF) and trifluoroethylene (TrFE) (PVDF-TrFE), aluminum nitride (AlN) or lead zirconate titanate (PZT). In one embodiment, PVDF is spin-coated to form a PVDF layer; a metal protection layer is plated on the PVDF layer; a wet etching process and photomasks are used to define the pattern of the piezoelectric element 221, including the position and size of the piezoelectric element 221, wherein the etching agent of the wet etching process may be but is not limited to be N,N'-dimethylacetamide (DMA). While PVDF-TrFE is used as the piezoelectric material, the etching agent of the wet etching process may be but is not limited to be 2-butanone. It is easily understood: a dry etching process, such as a reactive ion etching process, can also be used to remove a portion of PVDF or PVDF-TrFE and define the pattern of the piezoelectric element 221.

In one embodiment, aluminum nitride (AlN), which will not generate pollution in the CMOS process, is used as the piezoelectric material. A reactive pulse-DC magnetron sputtering process is used to form an AlN layer. Next, a dry etching process or a wet etching process using tetramethylammonium hydroxide (TMAH) as the etching liquid is used to remove a portion of AlN and define the pattern of the piezoelectric element 221.

In one embodiment, lead zirconate titanate (PZT) is used as the piezoelectric material. A sputtering method, which is disclosed in a US patent application No. US 2014/0049136 A1, is used to form a PZT thin film. Next, a dry etching method or a wet etching method is used to remove a portion of PZT and define the pattern of the piezoelectric element 221.

Figure 10:
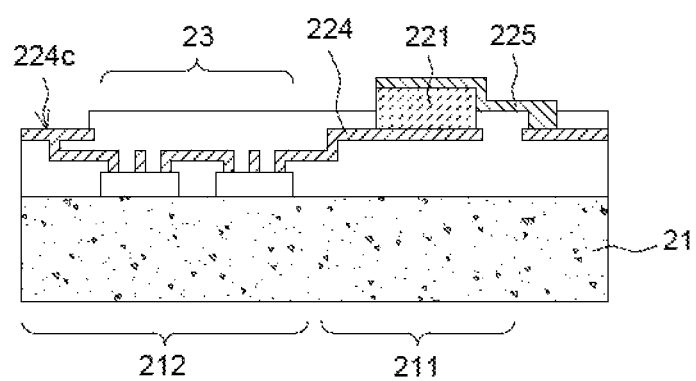

Refer to FIG. 10. Next, use a metal thin film process (such as a metal vapor deposition process) and a photolithographic process to plate and define the electrodes of the piezoelectric element 221. The electrodes of the piezoelectric element 221 are electrically connected with the electric-conduction contacts 224b through the electric-conduction traces 225. The PVDF material has porosity and thus features coarseness. While PVDF is used as the material of the piezoelectric element 221, aluminum or titanium, which is used as the electrode material in the semiconductor process, is adopted as the material of the electrodes of the piezoelectric element 221. While AlN is used as the material of the piezoelectric element 221, molybdenum (Mo) is adopted as the material of the electrodes of the piezoelectric element 221.

Then, open the etched windows, and use an anisotropic etching method and a tetramethylammonium hydroxide (TMAH) solution as the etching agent to remove a portion of the substrate 21, which is below the piezoelectric elements 221, to form the cavities 213 and the floating membranes 222 suspending in the opening end of the cavities 213, as shown in FIG. 2. According to the abovementioned process, the floating membrane 222 is fabricated from the passivation layer (such as the passivation layer made of silicon dioxide or silicon nitride). It is easily understood: the cavity 213, which is fabricated in the anisotropic etching method, has a projection to the substrate 21 equal to or larger than the projection of the floating membrane 222 to the substrate 21. The side wall of the cavity 213 is an inclined surface, which is a feature resulting from the anisotropic etching method.

It should be explained: the ultrasonic transducer array and the control circuit are transversely arranged on the substrate in the abovementioned embodiments. However, the present invention is not limited by the abovementioned embodiments. In other embodiments, a multilayer structure and a sacrifice layer can be used to arrange the ultrasonic transducer array and the control circuit in a vertical way.

In conclusion, the present invention proposes an ultrasonic biometric sensor, wherein the control circuit and the ultrasonic transducer array are fabricated on an identical substrate, whereafter in an MEMS (microelectromechanical system) process, an anisotropic etching process is used to form a cavity below each piezoelectric element of the ultrasonic transducer array, wherefore the ultrasonic biometric sensor of the present invention can be fabricated without using the wafer bonding process, whereby the yield and productivity is increased and the fabrication cost is decreased.

What is claimed is:
1. An ultrasonic biometric sensor comprising:
   a detection chip including:
      a substrate having a first region and a second region;
      an ultrasonic transducer array arranged on the first region and including a plurality of arrayed piezoelectric elements, wherein each piezoelectric element is disposed on a floating membrane, and wherein the floating membrane is suspended in an opening side of a cavity by at least one support arm extending transversely; and
      a control circuit arranged on the second region and electrically connected with each piezoelectric element through the support arm to control the ultrasonic transducer array to generate an ultrasonic wave and read a reflected ultrasonic signal received by the ultrasonic transducer array.

2. The ultrasonic biometric sensor according to claim 1, wherein a projection of the cavity to the substrate is larger than or equal to a projection of the floating membrane to the substrate.

3. The ultrasonic biometric sensor according to claim 1, wherein the cavity is formed in an anisotropic etching method.

4. The ultrasonic biometric sensor according to claim 1, wherein a side wall of the cavity is an inclined surface.

5. The ultrasonic biometric sensor according to claim 1, wherein a material of the piezoelectric element comprises polyvinylidene difluoride (PVDF), a mixture of polyvinylidene difluoride (PVDF) and trifluoroethylene (TrFE) (PVDF-TrFE), aluminum nitride (AlN) or lead zirconate titanate (PZT).

6. The ultrasonic biometric sensor according to claim 1, wherein the control circuit includes:
   a controller generating a clock signal to control the ultrasonic transducer array to generate the ultrasonic wave;
   a signal processor electrically connected with the controller and the ultrasonic transducer array to process the reflected ultrasonic signal received by the ultrasonic transducer array to enable the controller to output a biometric verification signal; and
   a communication interface electrically connected with the controller and enabling the ultrasonic biometric sensor to communicate with an external device.

7. The ultrasonic biometric sensor according to claim 6, wherein the communication interface comprises a serial peripheral interface (SPI) or a universal serial bus (USB).

8. The ultrasonic biometric sensor according to claim 1 further comprising:
   a protection layer covering the ultrasonic transducer array and the control circuit.

9. The ultrasonic biometric sensor according to claim 8, wherein a material of the protection layer comprises a photoresist material or polyimide.

10. The ultrasonic biometric sensor according to claim 1 further comprising:
    a packaging substrate having a plurality of electric-conduction contacts; and
    at least one passive element arranged on a first surface of the packaging substrate, wherein the detection chip is arranged on the first surface of the packaging substrate and electrically connected with the plurality of electric-conduction contacts and the at least one passive element.

11. The ultrasonic biometric sensor according to claim 10, wherein a material of the packaging substrate includes polyimide.

12. The ultrasonic biometric sensor according to claim 10, wherein the detection chip is joined with the packaging substrate through a plurality of metal bumps in a eutectic bonding method.

13. The ultrasonic biometric sensor according to claim 10, wherein the detection chip is fixed to the packaging substrate through an anisotropic conductive film.

14. The ultrasonic biometric sensor according to claim 10 further comprising:
    a filling material filled into gaps between the detection chip and the packaging substrate.

15. The ultrasonic biometric sensor according to claim 1, wherein the piezoelectric element has a working frequency within 20-30 MHz.

* * * * *